United States Patent
Armstrong et al.

(10) Patent No.: US 10,048,168 B2
(45) Date of Patent: Aug. 14, 2018

(54) SYSTEM AND METHOD FOR OPTIMIZING COMPONENT LIFE IN A POWER SYSTEM

(71) Applicants: Rolls-Royce Corporation, Indianapolis, IN (US); Rolls-Royce North American Technologies, Inc., Indianapolis, IN (US)

(72) Inventors: Michael J. Armstrong, Avon, IN (US); Christopher K. Ruff, Carmel, IN (US); John W. Smith, Carmel, IN (US); Curtis H. Cline, Brownsburg, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 597 days.

(21) Appl. No.: 14/579,320

(22) Filed: Dec. 22, 2014

(65) Prior Publication Data

US 2015/0185111 A1    Jul. 2, 2015

Related U.S. Application Data

(60) Provisional application No. 61/921,736, filed on Dec. 30, 2013.

(51) Int. Cl.
*G01B 3/52* (2006.01)
*G01B 3/44* (2006.01)
(Continued)

(52) U.S. Cl.
CPC .............. *G01M 15/14* (2013.01); *F02C 9/00* (2013.01); *G05B 23/0283* (2013.01);
(Continued)

(58) Field of Classification Search
CPC ..... G05B 23/0283; F02C 9/00; G07C 5/0816; B64D 2045/0085; F05D 2260/80
See application file for complete search history.

(56) References Cited

U.S. PATENT DOCUMENTS

| 6,490,543 B1 * | 12/2002 | Jaw ..................... G05B 19/4065 340/457.4 |
| 6,823,675 B2 | 11/2004 | Brunell et al. |

(Continued)

FOREIGN PATENT DOCUMENTS

| DE | 10211130 A1 | 9/2003 |
| WO | WO-2013191593 A1 | 12/2013 |

OTHER PUBLICATIONS

International Search Report dated Mar. 24, 2016, 3 pages. English Abstract of DE10211130 (A1).

*Primary Examiner* — Matthew G Marini
(74) *Attorney, Agent, or Firm* — Fishman Stewart PLLC

(57) ABSTRACT

An aircraft includes first and second gas turbine engines having a first component and a second component that is redundant with the first component, and an engine health monitoring system (EHMS) coupled to the first and second gas turbine engines. The EHMS is configured to calculate a remaining useful life (RUL) of the first component and of the second component, calculate a rate-of-life consumption of the first component and of the second component, predict when failure of the first component and failure of the second component will occur based on the RUL of each and based on the respective rate-of-life consumption of each, and provide instructions for altering operation of the aircraft that affects the RUL of the first or second component.

15 Claims, 5 Drawing Sheets

(51) Int. Cl.
*G01M 15/14* (2006.01)
*G05B 23/02* (2006.01)
*F02C 9/00* (2006.01)
*G07C 5/08* (2006.01)
*B64D 45/00* (2006.01)

(52) U.S. Cl.
CPC .... *G07C 5/0816* (2013.01); *B64D 2045/0085* (2013.01); *F05D 2260/80* (2013.01)

(56) References Cited

U.S. PATENT DOCUMENTS

| | | | |
|---|---|---|---|
| 6,860,712 B2 | 3/2005 | Pisano et al. | |
| 6,894,611 B2 * | 5/2005 | Butz | F02C 9/00 340/4.32 |
| 7,062,370 B2 | 6/2006 | Vhora et al. | |
| 7,203,554 B2 | 4/2007 | Fuller | |
| 7,280,941 B2 | 10/2007 | Bonanni et al. | |
| 7,496,798 B2 | 2/2009 | Link et al. | |
| 7,636,648 B2 | 12/2009 | Johansson et al. | |
| 7,725,293 B2 | 5/2010 | Bonissone et al. | |
| 7,769,507 B2 | 8/2010 | Volponi et al. | |
| 7,801,675 B2 | 9/2010 | Currie et al. | |
| 7,824,147 B2 | 11/2010 | Morris et al. | |
| 7,912,669 B2 | 3/2011 | Basu | |
| 7,934,123 B2 | 4/2011 | Gross et al. | |
| 8,000,930 B2 | 8/2011 | Poncet et al. | |
| 8,321,118 B2 | 11/2012 | Moeckly et al. | |
| 8,417,410 B2 | 4/2013 | Moeckly et al. | |
| 2003/0176954 A1 * | 9/2003 | Jaw | F01D 21/003 701/3 |
| 2004/0049715 A1 * | 3/2004 | Jaw | H04L 41/0681 714/43 |
| 2004/0225474 A1 | 11/2004 | Goldfine et al. | |
| 2008/0208487 A1 | 8/2008 | Goebel et al. | |
| 2010/0161196 A1 | 6/2010 | Goericke et al. | |
| 2012/0006935 A1 | 1/2012 | Bhargava | |
| 2012/0060505 A1 | 3/2012 | Fuller et al. | |
| 2012/0283963 A1 | 11/2012 | Mitchell et al. | |
| 2013/0006439 A1 | 1/2013 | Selvaraj et al. | |
| 2013/0018518 A1 * | 1/2013 | McMullin | H02J 3/14 700/292 |
| 2013/0073222 A1 | 3/2013 | Shin et al. | |
| 2013/0332025 A1 * | 12/2013 | Ziarno | G05B 23/0213 701/33.4 |

* cited by examiner

SYSTEM AND METHOD FOR OPTIMIZING COMPONENT LIFE IN A POWER SYSTEM

CROSS-REFERENCE TO RELATED APPLICATIONS

This application claims priority to U.S. Provisional Patent Application No. 61/921,736, filed Dec. 30, 2013, the contents of which are hereby incorporated in their entirety.

FIELD OF TECHNOLOGY

An improved integrated design and control of a gas turbine is disclosed. More particularly, performance and efficiency are improved by optimizing size and usage of components of a gas turbine, the components including propulsion, thermal, electrical, and control systems, as examples. The improvements are applicable to turbines used for propulsive power in marine, land, air, and underwater applications, as examples.

BACKGROUND

It has become increasingly desirable to improve the overall system design and operation of gas turbines. In a system having a typical gas turbine engine, electrical power is extracted via an electrical generator to supply electrical power to control systems, actuators, weapons systems, climate control systems, and the like. Electrical storage, such as a battery, is typically provided to operate such systems when the gas turbine engine is not running or to provide power for starting the gas turbine engine. In some known gas turbine engines, the gas turbine engine includes a high pressure shaft and a lower pressure shaft, and the electrical generator is coupled to one of the high and low pressure shafts.

However, extraction of power from the gas turbine engine via one of the shafts itself typically results in a loss in overall system life, and in particular to the components of the engine to which the electrical generator is coupled. Often, gas turbine systems are designed having redundant components or redundant systems. In one example, a system may include two gas turbine engines so that if one engine fails (or failure is imminent or expected and the engine is thus shut down or in need of maintenance), the other engine may be relied upon for continued safe operation. Such failure may be attributable to a life-limiting component within the failed engine. Although the engine relied upon for continued safe operation may have remaining life and could continue to operate for an extended period of time, its use may nevertheless be limited because the other engine has reached its end of useful life. That is, despite having one engine with possibly a significant amount of remaining useful life, the aircraft is nevertheless grounded for repair.

Further, in such a scenario (one engine, or a component therein, that is life-limited and one having significant remaining useful life), because the one engine is in need of repair, the second engine (though still healthy) may itself undergo repair despite its relative health. In such a case, although the second engine may not need repair, because of the need to repair the one engine, it typically makes sense under such circumstances to conduct repair work on the second engine as well. Or, in another scenario, a first engine may require scheduled maintenance due to a component that is approaching its end of useful life, while the second engine has significant remaining useful life. In such a case as well, although the second engine does not require scheduled maintenance, because of the maintenance on the first engine, it typically makes sense under such circumstances to conduct maintenance on the second engine as well.

In other words, in a two (or multi) engine system, a life-limiting component may force or require action to be taken to repair or perform maintenance on one engine, which can lead to repair or maintenance on a healthy engine as well, and which may be sooner than desired. Thus, the overall life of the system is compromised because if life consumption were better balanced, the overall system would perform for a longer period of time.

Overcoming these concerns would be desirable and could save the industry substantial resources.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine and schematic of an electrical system coupled thereto are described herein and are shown in the attached drawings. The electrical system includes at least two generator circuits, one coupled to a high pressure portion of a gas turbine engine and the other coupled to a low pressure portion of the gas turbine engine. Further, although illustrative examples are described with respect to a two-shaft engine, and two corresponding motor/generators, it is contemplated that the disclosure pertains to other gas turbine designs, such as a three shaft engine.

According to one example, an aircraft includes first and second gas turbine engines having a first component and a second component that is redundant with the first component, and an engine health monitoring system (EHMS) coupled to the first and second gas turbine engines. The EHMS is configured to calculate a remaining useful life (RUL) of the first component and of the second component, calculate a rate-of-life consumption of the first component and of the second component, predict when failure of the first component and failure of the second component will occur based on the RUL of each and based on the respective rate-of-life consumption of each, and provide instructions for altering operation of the aircraft that affects the RUL of the first or second component.

According to another example, a method of operating an aircraft includes calculating a remaining useful life (RUL) of a first component and of a second component of the aircraft that is redundant with the first component, calculating a rate-of-life consumption of the first component and of the second component, predicting when failure of the first component and failure of the second component will occur based on the RUL of each and based on the respective rate-of-life consumption of each, and providing instructions for altering operation of the aircraft that affects the RUL of the first or second component.

According to yet another example, a non-transitory computer-readable medium tangibly embodying computer-executable instructions comprising instructions to calculate a remaining useful life (RUL) of a first component and of a second component of an aircraft that is redundant with the first component, calculate a rate-of-life consumption of the first component and of the second component, predict when failure of the first component and failure of the second component will occur based on the RUL of each and based on the respective rate-of-life consumption of each, and provide instructions for altering operation of the aircraft that affects the RUL of at least one of the first and second components.

Figure 1:
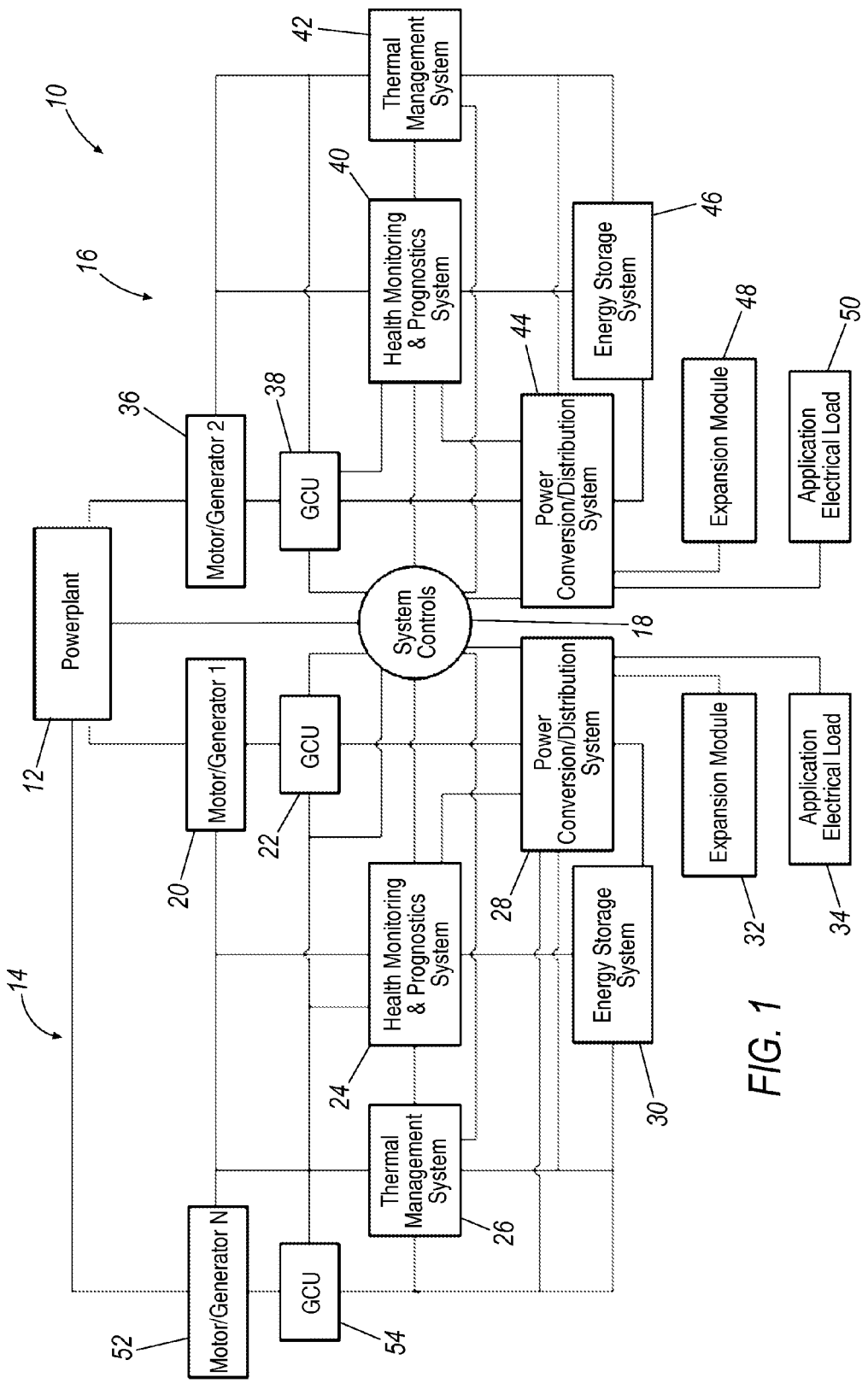
FIG. 1 is a schematic illustration of an electrical system coupled to a gas turbine engine, according to one example.

FIG. 1 illustrates an electrical system 10 in which a power plant or engine 12, such as a gas turbine engine, provides electrical power to a first power circuit 14 and a second power circuit 16. A system controller 18 is coupled to power plant 12 and also to first and second circuits 14, 16. First power circuit 14 includes a motor/generator 20 and a General Control Unit (GCU) 22 coupled thereto. GCU 22 is also coupled to other components within first power circuit 14, such as a health monitoring and prognostics system 24, a thermal management system 26, and a power conversion/distribution system 28. First power circuit 14 also includes an energy storage system 30, an expansion module 32, and application electrical load(s) 34. System controller 18 is configured to regulate power flow (such as electrical currents and voltages within system 10) to provide power to various electrical busses. The power may be DC, AC, or conversion therebetween. System controller 18 may also be configured to execute computer program instructions to control the operation of engine 12, including fuel flow, or the position of any variable geometry systems (e.g., from the flight control system of an aircraft or from a steering system of a ship).

Health monitoring and prognostics system 24 is generally a unit that monitors the health of system components, and may be used to estimate component life based on sensor feedback received from components within engine 12. Thermal management system 26 includes pumps, expansion valves, and the like, as well as a controller, to provide coolant for the purposes of climate control, and other system operations. Power conversion/distribution system 28 receives electrical power from motor/generator 20 via GCU 22, and converts the power to a more useable form such as a DC voltage for storage in energy storage system 30, expansion module 32, and application electrical load(s) 34. The energy storage system 30 may include a battery or other energy storage system. Energy storage system 30 stores energy for providing power when engine 12 is not running (i.e., not generating power), but also to provide power to motor/generator 20 to provide starting power to engine 12 during startup. Expansion module 32 and application electrical load 34 represent additional electrical components that receive power from power conversion/distribution system 28.

Second power circuit 16 similarly includes a motor/generator 36 and a GCU 38 coupled thereto. GCU 38 is also coupled to other components within second power circuit 16, such as a health monitoring and prognostics system 40, a thermal management system 42, and a power conversion/distribution system 44. Second power circuit 16 also includes an energy storage system 46, an expansion module 48, and application electrical load(s) 50. The components 36-50 of second power circuit 16 are similarly arranged as described with respect to first power circuit 14. Additionally, in one example electrical system 10 includes one or more additional motor/generators 52 and corresponding GCUs 54 as well, which may be coupled to a gas turbine engine as will be further described. Thus, the system 10 is modular and flexible in that it may be expanded to include a number N of motor/generators based on contemplated operating conditions.

Figure 2:
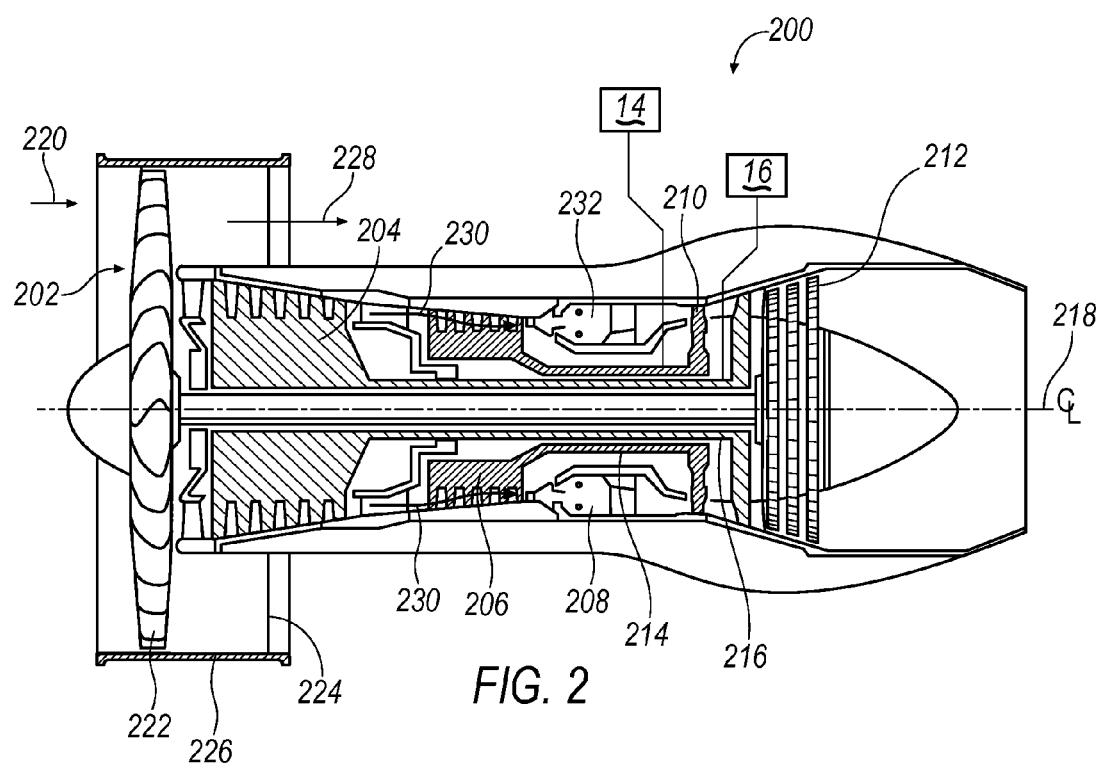
FIG. 2 illustrates an exemplary gas turbine engine that incorporates the electrical system illustrated in FIG. 1.

FIG. 2 illustrates a gas turbine engine 200, which includes a fan 202, a low pressure (LP) compressor and a high pressure (HP) compressor, 204 and 206, a combustor 208, and a high pressure turbine and low pressure turbine, 210 and 212, respectively. The high pressure compressor 206 is connected to a first rotor shaft 214 while the low pressure compressor 204 is connected to a second rotor shaft 216. The shafts extend axially and are parallel to a longitudinal center line axis 218. Ambient air 220 enters the fan 202 and is directed across a fan rotor 222 in an annular duct 224, which in part is circumscribed by fan case 226. Bypass airflow 228 provides engine thrust while a primary gas stream 230 is directed to a combustor 232 and the high pressure turbine 210.

First and second rotor shafts 214, 216, are coupled, respectively, to first and second power circuits 14, 16, as illustrated in FIG. 1. Thus, first and second power circuits 14, 16 are configured to split power between motor/generators 20, 36 so that each provides a portion of the power demand. As such, a power sharing/transfer arrangement between motor/generators 20, 36 provides the platform power demand, and includes a capability to provide power to one of the shafts 214, 216, as necessary. Such arrangement also provides an ability to optimize load shedding and a demand side management of the power requirement. Thus, life and performance considerations may be taken into account in real-time and optimized to actively seek and obtain performance optima while equipment is in operation.

Referring back to FIG. 1, as stated, health monitoring and prognostics systems 24, 40 monitor the health of system components within respective first and second power circuits 14, 16. As such, because the first and second power circuits 14, 16 are separately controllable, they provide components having system redundancy that can be traded off to improve the overall life of the system. For instance, thermal management system 26 within first power circuit 14 may include temperature sensors, pumps, and flow rate monitors, as examples, that pertain to the operation and cooling of first power circuit 14. Likewise, thermal management system 42 within second power circuit 16 may include its own temperature sensors, pumps, and flow rate monitors, as examples, that pertain to the operation and cooling of second power circuit 16. As one example, one of the motor/generators 20, 36 may be operated to output a greater electrical power to meet an electrical demand to an electrical load 34, while the other of the motor/generators 20, 36 may be operated to output a lesser electrical power to meet the electrical demand to its electrical load 50. In this example, each electrical load 34, 50 may include a common component or may provide redundant operation, such as providing lighting, pump power, and the like, within engine 12, as an example.

As such, a remaining useful life (RUL) can be calculated for components within each thermal management system 26, 42. Operation between circuits 14, 16 can thereby be selectively controlled to alter or improve the life of one of the components if that component is predicted to have an early life failure, as will be further described. Further, although thermal management system 26, 42 are provided as examples of systems within respective circuits 14, 16 that may include a life-limiting component, it is contemplated that other redundant components as well may have their RUL calculated, to include components within energy storage systems 30, 46, expansion modules 32, 48, electrical loads 34, 50, etc.

Thus, components within an engine, such as engine 10, provide a degree of component redundancy and protection from failure. Circuits 14, 16 are separately controllable such that component life in one of the circuits 14, 16 can be improved at the expense of components in the other circuit 14, 16 (that may have a longer predicted RUL), such that overall engine life is improved.

Figure 3:
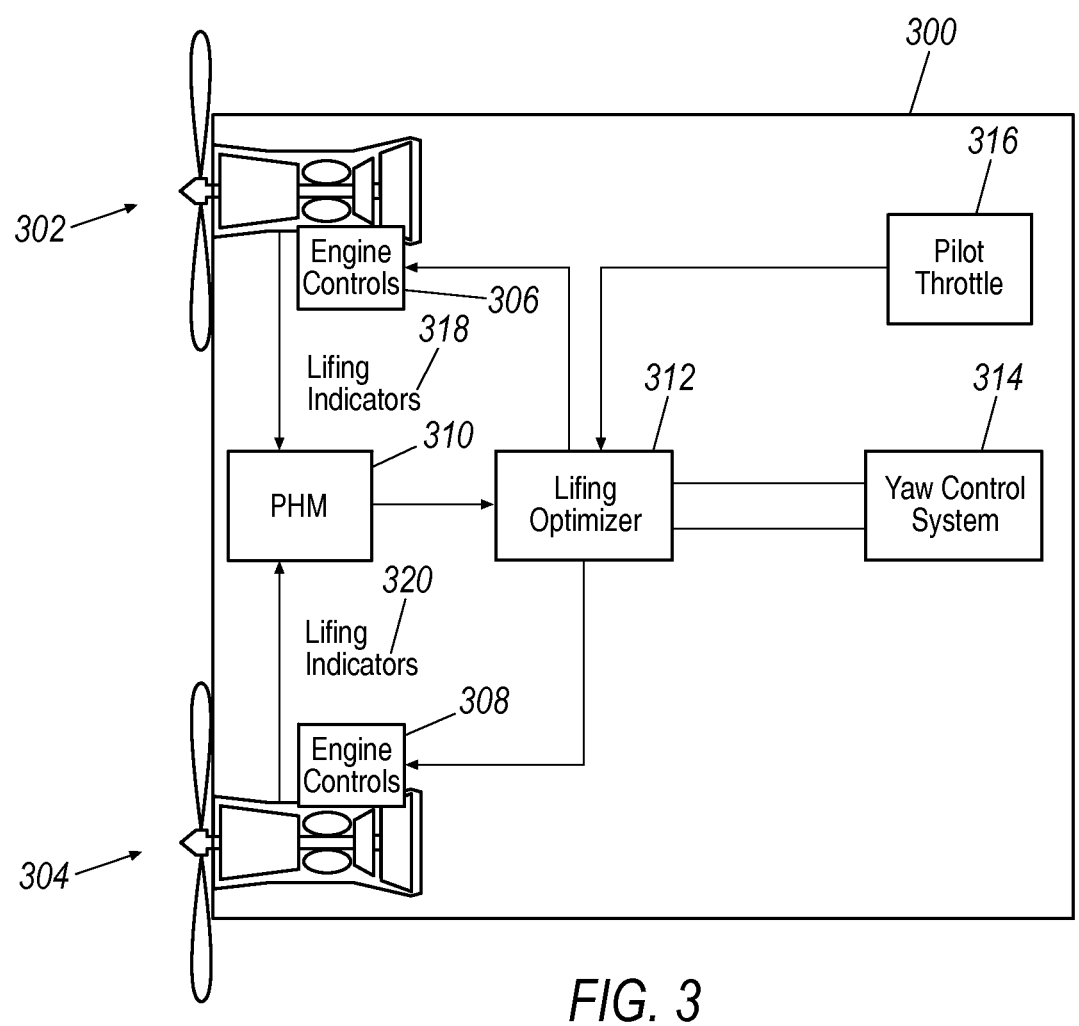
FIG. 3 illustrates a two-engine aircraft that incorporates the exemplary gas turbine engine of FIG. 2.

In addition, component RUL between engines within one aircraft can be calculated, and life tradeoffs can be made between engines as well. For instance, referring to FIG. 3, an aircraft 300 is illustrated having a first engine 302 and a second engine 304. Engines 302, 304 each correspond generally to power plant 12 of FIG. 1, to include respective engine controls 306, 308, each of which corresponds generally to system control 18. Aircraft 300 includes a prognostic health monitor (PHM) or engine health monitoring system (EHMS) 310 that is coupled to engines 302, 304, and also to a lifing optimizer 312. Lifing optimizer 312 is coupled to each of the engine controls 306, 308, to a yaw control system 314, and to a pilot throttle 316.

As summarized above, engine 10 of FIG. 1 includes redundant components and an ability to trade off life and performance therein. However, in an aircraft having two (or more) engines, such as aircraft 300, component life may be traded between engines 302, 304 as well. Lifing indicators 318, 320 may be conveyed from respective engines 302, 304 to PHM 310, which in turn sends component health information to lifing optimizer 312. Based thereon, RUL for components in engines 302, 304 may likewise be calculated, and a rate-of-life consumption for each may be calculated as well. As such, failure for each of the components can be predicted based on their respective RUL and on the rate-of-life consumption of each. Lifing optimizer 312 may then provide instructions to a control system or to an operator (such as a pilot) for altering operation of the aircraft in such a way that affects the RUL of the component that is first predicted to fail.

Thus, in general, PHM 310 assesses the current health of each system (either two circuits within one or both engines, or between the engines themselves), and projects a predicted time to failure of the system. The lifing optimizer contains lifing models which are updated by the PHM system, and the system uses these modes to calculate the RUL of all affected components under varying requirement allocations. This information is communicated as instructions to the system controllers for altering operation of the aircraft, in one example. In another example, instead of communicating this information to the system controllers, the information is communicated to the operator, who has operational options for the aircraft that include options, for example, to A) maximize a propulsion system objective comprising one of a thrust, an electrical loading, and a specific fuel consumption, B) extend the RUL of the component with the lowest RUL, or C) vary a load between the first component and the second component (i.e., within an engine or between engines), as examples.

In the two engine lifing optimization example, each engine controller receives commands that augment lifing optimization. Changes can thereby be implemented to increase life (such as providing acceleration limits, temperature limits, and the like). In this example, the optimizer 312 determines the thrust provided by either engine 302, 304, and also determines control variations in order to coordinate life consumption of the engines while considering the effect of differential thrust (to ensure adequate differential thrust between the two engines 302, 304, for example). That is, if the lifing models would suggest that operation of one of the components should be dialed back to the extent that, were it to be implemented, then inadequate differential thrust may result, then a pilot or operator may override. In such a scenario, an operational override may be implemented to trump the lifing calculations and operate the aircraft to ensure safe and stable thrust operation between the two engines.

In one example, the lifing optimizer 312 controls the motor/generators 20, 36 of each engine 302, 304 and converts or manages the power distribution of the overall system. The lifing optimizer 312 determines the proportion of the power provided by either motor/generator in each engine 302, 304 and provides those proportions to the respective circuit of the respective engine. In another example, energy storage units 30, 46 in each engine 302, 304 may be controlled as well. The lifing optimizer 312 thereby manages power to and from respective energy storage devices 30, 46, providing, for example, setpoints, gains, limits, and the like, to optimize overall system life. As still another example, the electrical system receives power from the motor/generators 20, 36 and either receives or delivers power to the energy storage devices 30, 46. The overall power demand is either observed by the optimizer 312 or communicated to a power optimizer by another control system.

The optimizer 312 minimizes overall operating cost of the system by varying loads provided to redundant components. In one example, such operation is transparent to an operator and performed automatically. However, in another example the operator plays an active role in determining the tradeoff. The tradeoff involves taxing one redundant system or component more than another such that lifing of components is generally made to have a similar predicted life, resulting in a better coordinated maintenance action.

Thus, actively managing life consumption, whether between two engines on an aircraft, or between electrical machines or circuits within each engine, offers benefits when operating the aircraft. For redundant components, the system provides lifing tradeoffs that may be available to an operator or pilot. For example, the pilot may choose to maximize propulsion system objectives (thrust/power, thrust response, electrical loading, specific fuel consumption (SFC)) where possible, choose to extend RUL where possible, or vary loads between components when one is life-limited. And, as stated, such operation ultimately leads to an advantage of aligning maintenance actions. That is, a user or customer can experience cost-savings by aligning maintenance operations and moving more toward a condition-based maintenance program that is actively monitored, rather than a simple schedule based program that typically may include maintenance inspections.

Figure 4:
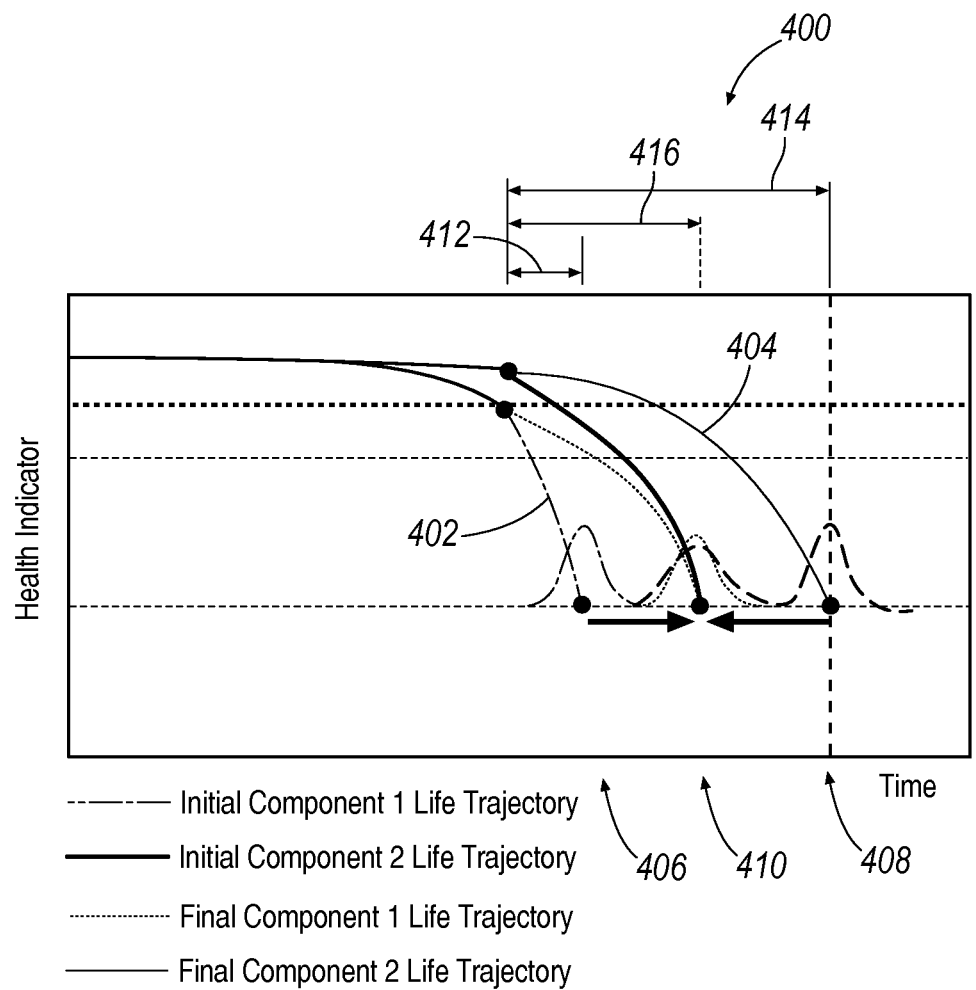
FIG. 4 illustrates an illustration of remaining useful life (RUL) curves for two components.

Referring to FIG. 4, a comparison 400 between two RULs for hypothetical first and second components is illustrated. A first component includes an initial component life trajectory 402 and a second component includes a second initial component life trajectory 404. Thus, the first component is predicted to fail at a first time 406 that is well in advance of the second time 408 when the second component is predicted to fail. The times to fail 406, 408 are dependent at least on the RUL of each as well as the rate-of-life consumption of each. However, by reducing the rate-of-life consumption of the first component, and increasing the amount of use of the second component (and thereby increasing its rate-of-life consumption), then both life trajectories can be affected to the extent that both will have a generally converged time of failure 410. Rate-of-life consumption may be determined based on operating temperatures, as an example, and predicting the rate of aging using, for instance, an Arrhenius model. Or, rate-of-life consumption may be based on empirical or theoretical failure rates based on experience or on industry standards.

Thus, if no action is taken, then a first maintenance action should be taken before the first component fails at time 406, but by predicting the RUL and impacting the rate-of-life consumption of both components, then an increased overall system life is obtained. In other words, a first RUL 412 is significantly shorter than a second RUL 414, thus a final RUL 416 can thereby be obtained by increasing the RUL for the first and decreasing the RUL for the second. In general, FIG. 4 is applicable across the different engines on an aircraft and within each engine, thereby optimizing life consumption between redundant components by providing instructions for altering operation of the aircraft that affects the RUL of redundant components, such that the component having the higher life consumption and/or rate of life consumption can be operated less stringently to increase its RUL and consume that of the lower RUL.

As such, health consumption of the engines can be impacted, accounting for engine to engine variation. And, if life consumption is at a faster rate than expected in one component, then load can be reallocated to a redundant device and the life consumption rate reduced in the one component. With redundant devices available, frequent assessment and reallocation can be applied to continuously ensure that the aircraft is overhauled at a desired time when the component life has been maximally consumed in redundant components.

That is, both RUL and rate of life consumption are used to identify which of the redundant components is healthier, and reliance is placed more heavily on the component having less degradation through a series of trades in real-time. This will enable expected maintenance action times to be stacked such that maintenance to the redundant components occurs simultaneously.

In addition, not only can component lifing be obtained in real-time based on life models and the like, but optimal model-based aging may be augmented based on knowledge gained from a fleet of aircraft. That is, a fleet level data management system may gather and process information regarding component lifing and degradation, failure events, and maintenance operations for all engines in a fleet. The term fleet, in one example, refers to all production engines of a certain, identifiable model type that have been delivered to customers and are in various stages of certified use. The information regarding the fleet of gas turbine engines in service is used to determine advantageous control systems parameters to obtain an overall improved life of the system. Recommended changes to the control system algorithms are communicated to the engine on regular intervals based on available communication and interaction with the engine or aircraft control system. This can occur at regular maintenance intervals, on ground data uplinks, or real-time as fleet level data updates are made available.

Figure 5:
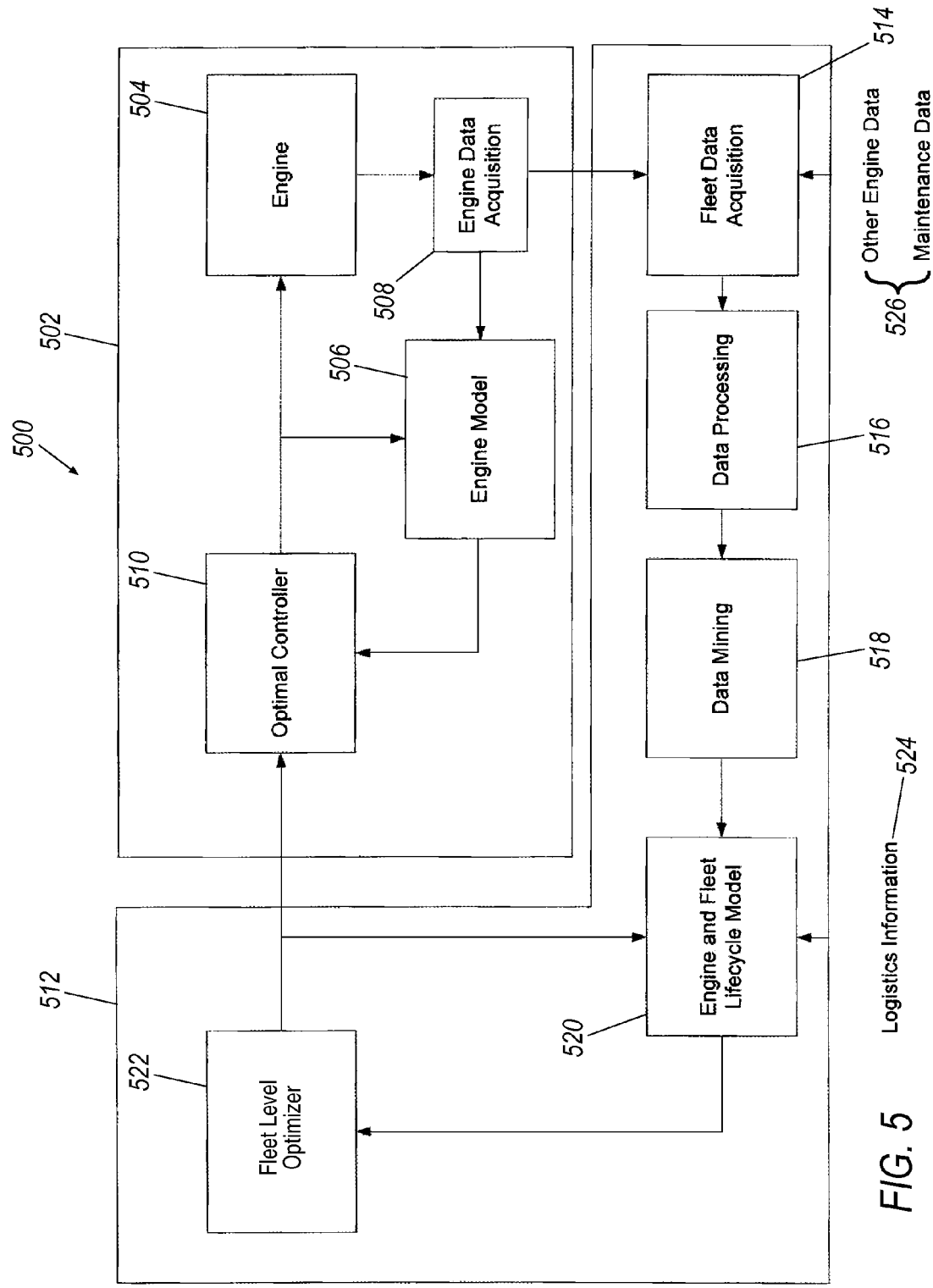
FIG. 5 illustrates a fleet-level management system for improving system life based on fleet-level information gathered.

Referring to FIG. 5, illustrated is an engine model-based system 500 with fleet level parameter management. In general and in one example, system 500 includes a control system 502 that corresponds to lifing optimizer 312 of aircraft 300 of FIG. 3. Engine control system 502 includes an engine 504, an engine model 506, engine data acquisition 508, and an optimal controller 510. System 500 also includes a fleet management control system 512 that includes fleet data acquisition 514, data processing 516, data mining 518, an engine and fleet lifecycle model 520, and a fleet level optimizer 522. The engine and fleet lifecycle model 520 includes logistics information 524 as input (fleet operational information, weather-based operation, average flight distance, and the like), and the fleet data acquisition 514 includes as input information 526 such as engine data from other engines, maintenance data for the fleet, and the like.

Lifecycle model 520 is an adaptable engine plant model, including a predictive controller with its associated optimizer, objective function, and limits. Additionally, data communication equipment is located at the engine controller 510 which communicates with a ground based system fleet level manager system. The fleet level manager consists of a data gathering system which communicates with the engines in the fleet and with maintenance and services databases 526. Data processing system 516 identifies and packages this data, and data mining and prediction tool 518 identifies fleet level trends or potential future events, and assesses the impact of engine control parameters on fleet level objectives.

As the fleet of engines is in operation the fleet level manager employs engine use information, failure and maintenance information, and estimated degradation information to verify and update its engine lifing models. With these continuously updated models the effect of engine control parameters on life-cycle cost and safety are evaluated. The results from this analysis are augmented with control schedules, objective function weightings developed for modeling the components, and engine component limits which advantageously affect the fleet as a whole.

Thus, engines in the fleet that are controlled by a predictive model based controller optimizes control parameters to meet a multi-objective overall evaluation criterion. The optimal control problem is subject to component limits which impact the feasible combinations of all control variables. As the engine operating environment changes throughout the mission, the control variables changes in order to meet the objectives. The engine performance model is updated with information which is gathered about the current state of the turbine engine. Additionally, at regular intervals, the optimal control parameters (limits and objective weightings) for the engine are updated based on the analysis performed by the fleet level manager.

Multiple drivers can contribute to the need to augment optimization constraints. If unscheduled maintenance events are shown to be directly influenced by optimal control parameters, the control strategy for all engines in the fleet can be augmented until corrective actions can be taken on a scheduled basis.

Additionally, logistics management and fleet performance management can be concurrently considered. Depending on the availability of maintenance facilities, spare parts, and the like, life can be traded for performance to maximize utilization and minimize repair time. An optimization objective function and limits can be manipulated to extract the maximum amount of life within its maintenance timeframe by advantageously limiting performance to a degree which is agreeable to an aircraft operator.

As such, component failures encountered by other engines in a fleet can be avoided or mitigated with minimal disruption to aircraft operations. Updates to component and lifing models can quickly change the values for component operating constraints control schedules for all engines within the fleet, thus extending component life, reducing unscheduled maintenance, and lowering recurring costs.

In addition, knowledge gained from older engines or engines with higher use can advantageously impact the way in which newer engines are controlled to mitigate potential future degradation or safety issues which will be expected to be encountered without significant hardware changes (i.e. increase the life of an engine subsystem or whole engine system by operating the engine system differently versus designing a new component and installing it on all new engines to gain an increase in life). Further, cost goals for an engine are assessed at the fleet level, and not at the level of an individual aircraft.

Computing devices such as system 10 generally include computer-executable instructions such as the instructions of the system controller 18, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An aircraft, comprising:
   first and second gas turbine engines, each having a first power circuit and a second power circuit, the first power circuit having a first aircraft component coupled thereto, and the second power circuit having a second aircraft component coupled thereto that is redundant with the first aircraft component; and
   an engine health monitoring system (EHMS) coupled to the first and second gas turbine engines, wherein the EHMS:
   receives sensor feedback from the first aircraft component and the second aircraft component;
   generates a remaining useful life (RUL) of the first aircraft component and of the second aircraft component;
   generates a rate-of-life consumption of the first aircraft component and of the second aircraft component;
   indicates when failure of the first aircraft component and failure of the second aircraft component will occur based on the RUL of each and based on the respective rate-of-life consumption of each;
   provides instructions for altering operation of the aircraft that affects the RUL of the first aircraft component or the second aircraft component; and
   the EHMS varies an amount of load on the first power circuit and the second power circuit to increase the RUL of the aircraft component with the lowest RUL, by reducing an amount of load on the power circuit having the aircraft component with the lowest RUL and increasing an amount of load on the other power circuit, such that the first aircraft component and the second aircraft component each have a generally converged time of failure.

2. The aircraft of claim 1, wherein the EHMS includes operating instructions to ensure adequate differential thrust between the first turbine engine and the second turbine engine.

3. The aircraft of claim 1, wherein the first aircraft component and the second aircraft component are both in the first gas turbine engine, and the EHMS provides instructions such that the first gas turbine is operated to increase the RUL of the component with the lowest RUL.

4. The aircraft of claim 1, wherein the EHMS provides instructions such that an operator of the aircraft has operational options for the aircraft that include options to:
A) maximize a propulsion system objective comprising one of a thrust, an electrical loading, and a specific fuel consumption;
B) extend the RUL of the aircraft component with the lowest RUL; and
C) vary a load between the first aircraft component and the second aircraft component.

5. The aircraft of claim 1, wherein the EHMS generates the RUL of the first aircraft component and the second aircraft component based on a local observation of the first and second components within the aircraft.

6. The aircraft of claim 1, wherein the EHMS generates the RUL of the first aircraft component and the second aircraft component based on a lifing model of the first aircraft component and the second aircraft component that includes component failures of the same components within a fleet of aircraft.

7. A method of operating an aircraft, comprising:
receiving sensor feedback from a first component and a second component of an aircraft, the second aircraft component being redundant with the first aircraft component;
generating a remaining useful life (RUL) of the first aircraft component and of the second aircraft component;
generating a rate-of-life consumption of the first aircraft component and of the second aircraft component;
indicating when failure of the first aircraft component and failure of the second aircraft component will occur based on the RUL of each and based on the respective rate-of-life consumption of each; and
providing instructions for altering operation of the aircraft that affects the RUL of the first aircraft component or the second aircraft component;
wherein the first aircraft component is coupled to a first power circuit of the first gas turbine engine, and the second aircraft component is coupled to a second power circuit of the first gas turbine engine, and further comprising providing the instructions for altering operation of the first power circuit and the second power circuit to increase the RUL of the aircraft component with the lowest RUL; and
wherein altering the operation of the aircraft includes reducing an amount of load on the power circuit having the aircraft component with the lowest RUL and increasing an amount of load on the other power circuit, such that the first aircraft component and the second aircraft component each have a generally converged time of failure.

8. The method of claim 7, further comprising providing the instructions to include adequate differential thrust between the first turbine engine and the second turbine engine.

9. The method of claim 7, wherein the first aircraft component and the second aircraft component are both in the first gas turbine engine, and further comprising providing the instructions such that the first gas turbine is operated to increase the RUL of the aircraft component with the lowest RUL.

10. The method of claim 7, further comprising providing the instructions such that an operator of the aircraft has operational options for the aircraft that include options to:
A) maximize a propulsion system objective comprising one of a thrust, an electrical loading, and a specific fuel consumption;
B) extend the RUL of the aircraft component with the lowest RUL; and
C) vary a load between the first aircraft component and the second aircraft component.

11. The method of claim 7, further comprising generating the RUL of the first aircraft component and the second aircraft component based on a local observation of the first and second components within the aircraft.

12. The method of claim 7, further comprising generating the RUL of the first aircraft component and the second aircraft component based on a lifing model of the first aircraft component and the second aircraft component that includes component failures of the same components within a fleet of aircraft.

13. A non-transitory computer-readable medium tangibly embodying computer-executable instructions that when executed by a processor provide operations comprising:
receive sensor feedback from a first component and a second component of an aircraft, the second aircraft component being redundant with the first aircraft component;
generate a remaining useful life (RUL) of the first component and of the second aircraft component that is redundant with the first aircraft component;
generate a rate-of-life consumption of the first aircraft component and of the second aircraft component;
indicate when failure of the first aircraft component and failure of the second aircraft component will occur based on the RUL of each and based on the respective rate-of-life consumption of each; and
provide instructions for altering operation of the aircraft that affects the RUL of at least one of the first aircraft component and the second aircraft component;
wherein the first aircraft component and the second aircraft component are both in the first gas turbine engine,
wherein the first gas turbine is operated to increase the RUL of the component with the lowest RUL, and
wherein the first aircraft component is coupled to a first power circuit of the first gas turbine engine, and the second aircraft component is coupled to a second power circuit of the first gas turbine engine; and
the operations further comprising to alter operation of the first power circuit and the second power circuit to increase the RUL of the aircraft component with the lowest RUL by reducing an amount of load on the power circuit having the aircraft component with the lowest RUL and increasing an amount of load on the other power circuit, such that the first aircraft component and the second aircraft component each have a generally converged time of failure.

14. The computer-readable medium as claimed in claim 13, wherein the first aircraft component is in the first turbine engine and the second redundant aircraft component is in the second turbine engine, and
- wherein the first gas turbine or the second gas turbine having the component with the lowest RUL is operated less stringently to increase the RUL of the aircraft component with the lowest RUL, and
- the operations further comprising to provide a limitation to a differential thrust between the first turbine engine and the second turbine engine.

15. The computer-readable medium as claimed in claim 13, the operations further comprising at least one of:
- generate the RUL of the first aircraft component and the second aircraft component based on a local observation of the first aircraft component and the second aircraft component within the aircraft; and
- generate the RUL of the first aircraft component and the second aircraft component based on a lifing model of the first aircraft component and the second aircraft component that includes component failures of the same aircraft components within a fleet of aircraft.

* * * * *